United States Patent [19]

Schwartz

[11] Patent Number: 4,685,181
[45] Date of Patent: Aug. 11, 1987

[54] HEAVY DUTY ROTARY DISC RASP

[76] Inventor: Jerry C. Schwartz, 2020 NE. 140th, Seattle, Wash. 98125

[21] Appl. No.: 717,643

[22] Filed: Mar. 26, 1985

Related U.S. Application Data

[63] Continuation-in-part of Ser. No. 511,560, Jul. 7, 1983, abandoned.

[51] Int. Cl.⁴ .............................................. B23D 71/00
[52] U.S. Cl. ........................................ 29/78; 350/274
[58] Field of Search ............... 29/78, 79, 80; 356/25, 356/23; 73/432 L; 350/274

[56] References Cited

U.S. PATENT DOCUMENTS

| 643,717 | 2/1900 | Ingalsbe | 29/78 |
| 1,904,566 | 4/1933 | Tate | 350/274 |
| 2,986,063 | 5/1961 | Etzenhouser | 350/274 |
| 3,289,397 | 12/1966 | Casselman et al. | |
| 3,604,490 | 9/1971 | Bricker | |
| 3,737,984 | 6/1973 | Pietroski | 29/78 |
| 4,023,572 | 5/1977 | Weigand et al. | 29/78 |
| 4,069,568 | 1/1978 | Sakamoto et al. | |
| 4,137,617 | 2/1979 | Newmayer | |

FOREIGN PATENT DOCUMENTS 229453  9/1959  Australia .................. 76/101 SM Primary Examiner—Nicholas P. Godici
Assistant Examiner—Jerry Kearns
Attorney, Agent, or Firm—Robert L. Harrington

[57] ABSTRACT

A rotary disc rasp formed from a dish shaped rigid metal plate. Holes are punched or drilled through the plate in the direction of rotation and the rear edges of the holes are forced outwardly relative to the convex side of the plate to provide cutting teeth thereon. The cutting teeth define a curved cutting area on the plate whereby engagement of the cutting teeth with a work piece can be controlled. The plate is preferably mounted to a right angle grinder which rotatably drives the rasp for controlled removal of material as required for shaping and fitting in a sculpture or construction operation.

6 Claims, 5 Drawing Figures

U.S. Patent  Aug. 11, 1987  4,685,181
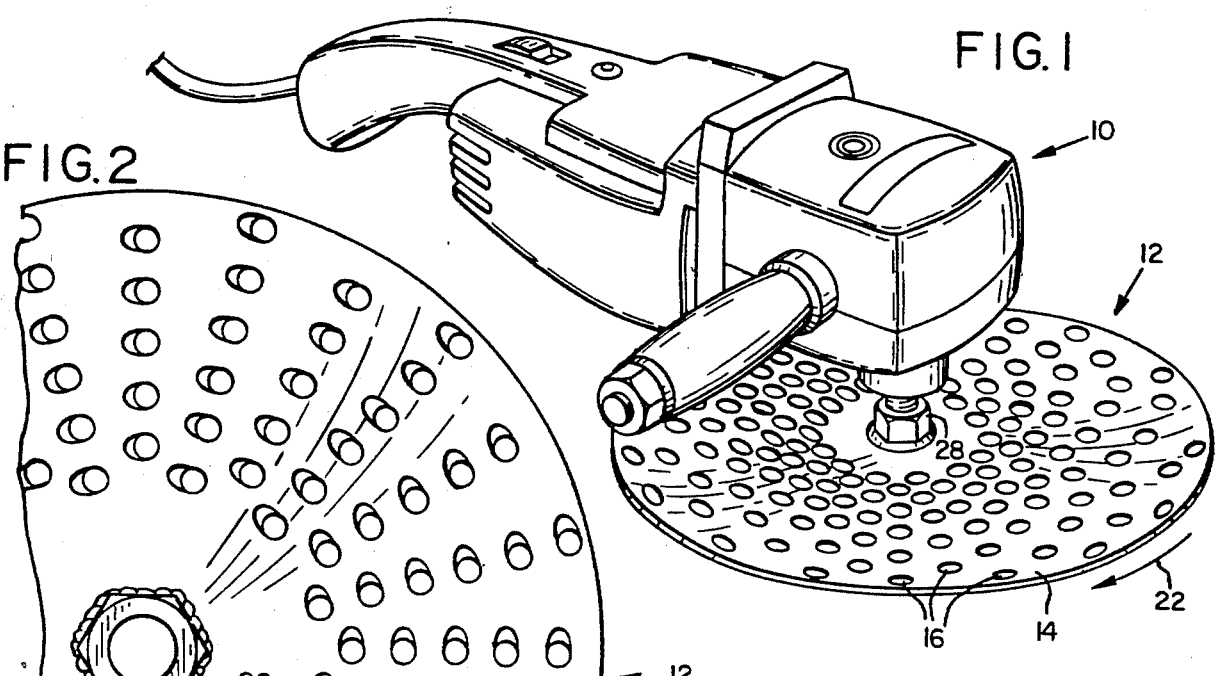
FIG. 1
FIG. 2
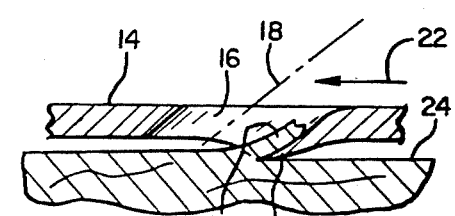
FIG. 4
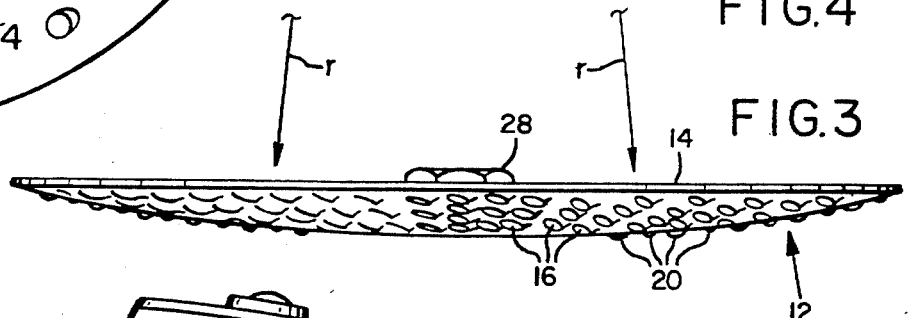
FIG. 3
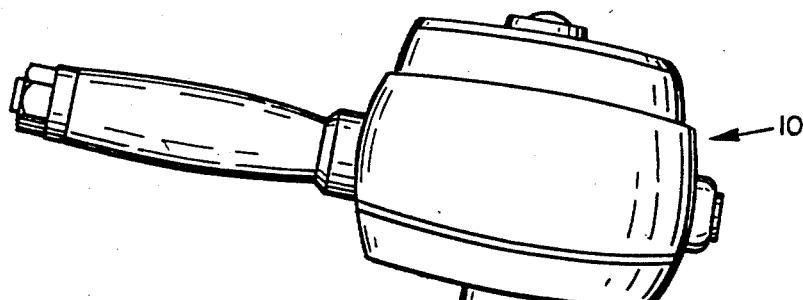
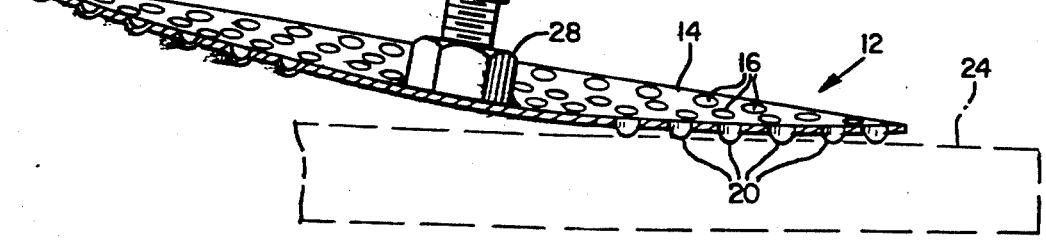
FIG. 5

HEAVY DUTY ROTARY DISC RASP

This application is a continuation-in-part of U.S. Ser. No. 511,560, filed July 7, 1983 and now abandoned (same title and applicant).

FIELD OF INVENTION

This invention relates to a power driven tool for quickly and controllably removing material as desired, for example, in construction or sculpturing operations.

BACKGROUND OF THE INVENTION

Tools for shaping and fitting such as used by carpenters and wood sculptors are available in many forms. For the most part these tools can be classified in one of two ways, i.e., they are either rough working tools or finishing tools. Examples of rough working tools are the various power saws including circular saws, band saws, jig saws etc. Examples of finishing tools are wood chisels, wood planes, sanders, wood rasps and the like, most of which are hand driven tools but in some cases may also be powered.

The problem with finishing tools is that they are slow. They are designed to remove a small amount of material within a precise location. When, for example, it is desired to remove a quarter of an inch to an inch of wood, the user will be a long time in removing the material with a wood rasp or plane. A power saw, on the other hand, is not easily controlled when cutting away thicknesses of an inch or less and are generally considered unusuable in such circumstances.

Various tools designed primarily as either rough working or finishing tools have been modified in an attempt to make the semi-finishing work easier for the carpenter or sculptor. As an example, high speed belt sanders are available which can be mounted with course sand belts that will "eat" the wood material quickly. However, such sanders carve away fairly wide paths of the material which is not desirable in many cases. The belts quickly wear out and have to be replaced, and they generate large amounts of dust. Often this dust is messy, makes breathing difficult and makes the working surface difficult to see during the sanding operation.

SUMMARY OF INVENTION

The present invention is believed to provide the answer to the need for a semi-rough, semi-finishing tool for carpenters, wood sculptors and the like. In the preferred embodiment, a rigid metal plate is dish shaped with the cutting surface convexly curved. A pattern of holes are provided in the plate and the holes are formed at an angle to the plate such as to develop a cutting edge protruding slightly from the cutting surface. A mounting nut is provided at the center of the concave side of the plate adapted to mount the plate to the rotating shaft of a power tool. Material is removed in the form of small chips that escape through the holes. The curved surface being rigid and thus non-deformable while removing wood in a rasping type operation allows for controlled engagement of the cutting surface with the material being worked on.

DETAILED DESCRIPTION AND DRAWINGS

The invention and its advantages will be more clearly understood by reference to the following detailed description including the drawings wherein:

FIG. 1 is a perspective view of a power tool having mounted thereon a dish shaped rotary disc rasp in accordance with the present invention;

FIG. 2 is a partial plan view of the inner or concave side of the rotary disc rasp shown in FIG. 1;

FIG. 3 is a side view of the rotary disc rasp of FIGS. 1 and 2;

FIG. 4 is an enlarged partial, sectional view as taken on lines 4—4 of FIG. 2; and FIG. 5 is a reduced side view of the rotary disc rasp in operation.

Referring to the drawings, FIG. 1 illustrates a right angle grinder 10 of conventional design having mounted thereon a rotary disc rasp 12 of the present invention. The rotary disc rasp 12 includes a rigid metal circular plate 14 that is dish shaped, i.e., it is unidirectionally bowed or curved from its center to its periphery to generally form a section of a sphere. The plate 14 is sufficiently thick to be non-deformable while removing wood from a work piece in a wood rasping operation.

A pattern of holes 16 are provided in the plate as by drilling or punching from the inside as indicated by arrow 18 in FIG. 4. The holes are formed at an angle alpha in a manner which forces edge portion 20 of the hole 16 to be slightly offset or protruded from the surface. The holes are formed in rows that extend radially from the center of the plate. The edge portion 20 of each hole 16 is the following edge portion of the hole as determined by the rotation of the plate indicated by arrow 22. Located on the inside center of the plate 14, as by brazing or welding, is a nut 28 that is adapted to be threadably engaged by the shaft of the grinder 10.

As particularily illustrated in FIG. 4, each protruding edge 20 functions as a cutting tooth designed to cut into the surface 24 of a work piece and remove chips 26 therefrom which are directed out through the holes 16. Referring to FIG. 5, it will be noted that the edges 20 forming the cutting teeth that are successively positioned outwardly from the center, define a rigid non-deformable and continuously curved cutting section that is slightly raised on the surface of the plate, which curvature conforms to the curvature of the plate. Thus when engaging the surface 24 of a work piece, the rotary disc rasp 12 is tilted in the manner illustrated with only a small area of the rasp (and thus only a limited number of the teeth) contacting the work piece.

CONSTRUCTION AND OPERATION

In an actual tool constructed in accordance with the invention, a 1/16 inch thick, low carbon steel plate, having a diameter of 9 inches was pressed into a uniformly directed convex curve having a radius "r" of about 40 inches. One hundred thirty two holes of ¼ inch diameter were drilled into the plate from the concave side. The holes were provided in radially directed rows, alternating between 5 and 6 holes per row with 24 rows symmetrically arranged around the plate at 15° intervals. The 6 hole rows were arranged with the outermost hole adjacent the periphery and successive holes in that row located at ½ inch intervals, center to center. The holes of the 5 hole rows were aligned between the holes of the 6 hole rows.

The holes were drilled through the plate and then angle reamed at about 60° toward the direction of intended rotation. A punch was then driven into the angled opening to produce a following edge that protruded from the convex surface about 1/16 inch. A inch threaded nut was brazed to the center of the concave side and the completed disc rasp was mounted on a high speed, heavy duty right angled grinder.

The rotating disc rasp has particular application for grinding wood surfaces and is used by tilting the rasp relative to the work piece. A small portion of the curved area of the rotating rasp, wherein the cutting teeth are located, is brought into contact with the surface of the work piece. The rasp is then worked back and forth and tilted more or less relative to the work piece, as desired, to achieve the intended removal of the wood.

It has been found that a number of advantages result from the rotary disc rasp of this invention. As compared to a flat disc, the disc rasp of the present invention allows the operator to avoid the grabbing effect that results when a number of teeth dig into a work piece simultaneously. The plate is preferably rigid i.e. it is non-deformable when pressed against the wood surface in a wood rasping operation and can thus be constructed of durable long lasting material that will hold a cutting edge for long periods of time. The numerous holes function to cool the rotary disc and renders the disc transparent when rotating at a high speed. The work piece surface can thus be viewed as the material is cut away. The chips are simply ejected through the holes and onto the ground with a minimum of bother to the operator. Most importantly, it permits relatively delicate removal of the material in a highly controlled, relatively rapid manner never before achieved by tools known to the construction and sculpture trade.

As mentioned, the holes provided in the disc produce a transparent annular band or window through the metal surface of the disc when the disc is rotating at a sufficient rotative speed. A typical rotative speed for a work tool such as the present disc rasp is in the order of 5,000 rpm, well above the sufficient rotative speed to achieve transparency. However, the minimum rotative speed can be calculated as follows:

First, it is necessary to provide sufficient illumination. 100 foor candles of illumination is more than adequate when looking directly at the work surface. If, in viewing the work surface through the window of the disc, the work surface is covered 50% of the time (i.e. 50% holes and 50% non-holes) the illumination passing through the holes is half the actual illumination, and to achieve "observed" 100 foot candles of illumination requires 200 foot candles of "actual" illumination. As less and less foot candle power is used or as the ratio of openings to non-openings is reduced, the object observed through the openings becomes dimmer and dimmer. It also follows that in addition to adequate light, the relationship of openings to non-openings throughout the cutting surface area should be constant to avoid the occurance of inner bands of lighter or darker appearance.

Assuming the achievement of adequate illumination, the next criteria is the achievement of a minimum pass rate so as to avoid "flicker". This criteria is satisfied at 60 Hz or 60 passes of the holes past the line of sight per second. In other words, the object being observed should not be covered by a solid area of the disc any longer than 1/60th of a second.

Again assuming adequate illumination, it follows that a single hole in a disc rotating at 60 revolutions per second or 3600 rpm will produce a transparent annular band or window in the disc. (Note however that the ratio of opening to non-opening would likely require very high illumination.) If multiple holes are aligned i.e. a series of holes equal distance from the center of rotation, the required rpm for the disc is reduced. The reduced rpm is based on the spacing between holes of the two holes spaced farthest apart. The spacing is determined in angular degrees which is divided by 360 and the resultant fraction multiplied by 3600 (the minimum rpm for a single hole). Thus the minimum rpm ($m_n$rpm) required for transparency is the maximum angular distance ($m_x$ad) between any two holes in a row of holes divided by 360 and multiplied by 3600 or $$m_n\text{rpm} = (m_x\text{ad})/360 \times 3600 \text{ or}$$

$$m_n\text{rpm} = 10\ m_x\text{ad}$$

Example, in a row of two holes spaced 15° apart, the $m_x$ad = 345° and $m_n$rpm = 3,450 rpm.

Other skilled in the art will envision other applications through modification and improvement of the above disclosed embodiment without departing from the inventive concept as encompassed by the claims appended hereto.

I claim:

1. A rotary disc rasp adapted to be mounted on a power tool and rotatably driven in a designated direction for controllably removing wood material from a wood work piece comprising; a rigid circular metal plate of sufficient thickness to be nondeformable in a wood rasping operation, said plate having a unidirectionally curved portion from center to periphery to form a dish shape having a convex side and a concave side, a designated annular cutting area within the curved portion of the plate, said plate having a plurality of circular openings formed in the designated cutting area, each opening defining a concavely curved following edge portion as determined by the designated direction of rotation, the following edge portions of said openings protruded outwardly from the convex side of the plate to form a plurality of concavely curved cutting teeth each having shallow side cutting edges progressing rearwardly and outwardly to the apex of the curve, said plurality of cutting teeth located at a plurality of radial positions spanning the designated cutting area with the apices of the cutting edges defining a non-deformable and continuously curved cutting section that is slightly raised on the surface of the plate and which curved cutting section is curved similarly to the curved portion of the plate, and mounting means for mounting the rotary disc rasp to a power driven tool.

2. A rotary disc rasp as defined in claim 1 wherein the cutting teeth are positioned in a plurality of radially directed rows, said rows symmetrically located around the plate and at least one row having cutting teeth positioned intermediate of the positions of the cutting teeth of a second row.

3. A rotary disc rasp as defined in claim 5 wherein the openings in the plate provide viewing windows through the plate, said openings positioned at closely spaced intervals whereby rotation of the plate renders the plate within the designated cutting area transparent to the operator.

4. A rotary disc rasp as defined in claim 1 wherein said plate is a non-deformable steel plate of at least one sixteen inch thickness.

5. A method for controllably removing wood from a wood work piece in a rasping operation which includes:

forming a rigid metal disc into a dish shape having an outer convex side, said disc adapted for rotation about a center axis in one circular direction, and having a designated annular section that is continuously curved from center to periphery, and said disc having sufficient thickness to be non-deformable in a wood rasping operation;

providing holes through the disc in the designated annular section, said holes each defining a circular edge having leading and following edge portions as determined by the direction of rotation, and each said following edge portion being a cutting edge portion protruded outward of said outer convex side of the disc progressing outwardly from the leading to the rearward most point of the following edge portion, said holes positioned to provide, cutting edge portions in overlaping arrangement and thereby continuously across the annular section, center to periphery, and further to provide corresponding visible openings through the disc across the annular section, center to periphery;

and further providing a combination of work piece illumination, arrangement of holes in the disc, and rotative speed for the disc whereby utilization of the disc in a wood rasping operation renders the annular section of the disc transparent to thereby enable viewing of the work piece during such operation.

6. A method as defined in claim 5 wherein the rotative speed of the disc during operation is maintained at a minimum rotative speed equal to 10 times the angular distance between the furthest spaced apart rotatively aligned holes.

* * * * *

UNITED STATES PATENT AND TRADEMARK OFFICE
CERTIFICATE OF CORRECTION

PATENT NO. : 4,685,181

DATED : August 11, 1987

INVENTOR(S) : Jerry C. Schwartz

It is certified that error appears in the above-identified patent and that said Letters Patent is hereby corrected as shown below:

Column 4, line 58, the portion of Claim 3 reading "as defined in claim 5" should read -- as defined in claim 2 --.

Signed and Sealed this

Twenty-ninth Day of December, 1987

*Attest:*

DONALD J. QUIGG

*Attesting Officer*  *Commissioner of Patents and Trademarks*